United States Patent [19]

Adamson

[11] Patent Number: 4,975,965
[45] Date of Patent: Dec. 4, 1990

[54] LOUDSPEAKER DESIGN

[76] Inventor: Alan B. Adamson, 817 Broch Road, Unit #9, Piceting, Ontario, Canada, L1W 3L9

[21] Appl. No.: 257,572

[22] Filed: Oct. 14, 1988

[30] Foreign Application Priority Data

Oct. 16, 1987 [GB] United Kingdom ............... 8724299

[51] Int. Cl.$^5$ .................... G10K 13/00; H04R 7/00
[52] U.S. Cl. ................................ 381/156; 381/158; 181/159; 181/185
[58] Field of Search ............... 381/156, 158; 181/159, 181/185, 186, 152, 177, 156

[56] References Cited

U.S. PATENT DOCUMENTS

| 1,962,374 | 9/1929 | Woolf et al. | 181/31 |
| 2,183,528 | 12/1939 | Blackburn | 181/159 |
| 2,942,071 | 6/1960 | Witchey | 179/115.5 |
| 4,031,337 | 6/1977 | Okamura et al. | 381/156 |
| 4,050,541 | 9/1977 | Henricksen | 181/159 |
| 4,152,552 | 1/1978 | Meyer | 179/115.5 |
| 4,157,741 | 6/1979 | Goldwater | 181/156 |
| 4,525,604 | 6/1985 | Frye | 381/1 |
| 4,628,155 | 12/1986 | Robineau et al. | 381/156 |

FOREIGN PATENT DOCUMENTS 1063062 10/1962 United Kingdom .

Primary Examiner—Jin F. Ng
Assistant Examiner—M. Nelson McGeary, III
Attorney, Agent, or Firm—Sim & McBurney

[57] ABSTRACT

A loudspeaker including a diaphragm for generating sound waves, the diaphragm being comprised of a peripheral conical portion adjacent to and surrounding a central domed portion, a flared horn adjacent to the diaphragm for receiving and projecting the sound waves into an acoustical space, a phasing plug intermediate the diaphragm and the horn defining sound pathways for impedance matching of the diaphragm and the horn. A plurality of sound channels extend through the phasing plug from the peripheral conical portion and the central domed portion of the diaphragm to the horn. The plurality of sound channels provide time compensated paths of equal length for the sound waves generated at both the peripheral conical portion and the central domed portion of the diaphragm. The present invention is also directed to a method of forming diaphragms for use in loudspeakers using a mold comprised of a hard die surface on one side and an opposing flexible die surface on the other side for applying uniform pressure to resin-impregnated multiple fabric layers, each layer being oriented with an angular offset of weave angle relative to adjacent layers, resulting in formation of a uniform mold of the multiple fabric layers.

3 Claims, 2 Drawing Sheets

LOUDSPEAKER DESIGN

The present invention relates in general to a horn-type loudspeaker design, and more particularly to a compression driver having equal length time compensated sound paths and to a method of forming diaphragms for loudspeakers.

Phasing plugs are well known in present day loudspeakers for impedance matching the output of a speaker diaphragm to the throat of a flared horn. The phasing plug is typically in the form of a conically nested body and centred within the throat of the horn adjacent to the diaphragm.

For example, U.S. Pat. Nos. 4,152,552 (Meyer), 2,942,071 (Witchey) and 1,962,374 (Roolf et al) each disclose a horn-type loudspeaker employing a phasing plug arrangement adjacent a spherical segment diaphragm. Each of the phasing plugs also includes one or more air channels extending from the diaphragm to the throat of the horn. The converging air channels act to prevent the audio pressure waves generated by the diaphragm from cancelling as the waves converge at the throat of the horn.

U.S. Pat. No. 4,050,541 (Henricksen) discloses a loudspeaker with a spherical diaphragm and a phasing plug having evenly-spaced radial slots or channels formed therein. According to Henricksen, the walls of the slots are tapered exponentially from their inlet ends at the speaker diaphragm towards a flat plane outlet at the throat of the horn in order to provide optimum impedance matching between the output of the diaphragm and the input of the horn.

In a similar vein, U.S. Pat. No. 4,525,604 (Frye) discloses a horn loudspeaker with convex diaphragm and phasing plug having a plurality of linear channels of equal length extending from different portions of the convex dome of the diaphragm to a circular groove joining the phasing plug to the throat of the horn, such that sound entering the horn at the throat from different portions of the diaphragm is in phase, and interference is avoided.

The above-mentioned prior art systems are limited to use with standard spherical shell (i.e. convex or concave) domed diaphragms.

While spherical shell diaphragms are suitable for use in high frequency loudspeakers, it has been found that such diaphragms are typically inappropriate for use with mid-range frequency loudspeakers. For example, a typical mid-range driver requires a 50 to 70 square inch diaphragm surface in order to generate appropriate frequency signals. Since spherical shell diaphragms are vibrated by means of voice coils around the perimeter thereof, a mid-range driver incorporating such a spherical shell diaphragm would require an inordinately large voice coil. The cost and weight of a magnet structure (i.e. motor) driving the voice coil is generally deemed to be prohibitive.

Accordingly, present day mid-range drivers are currently being designed with either a small diameter (e.g. 6-inch) diaphragm as in the above-discussed prior art, or with an inner spherical domed portion and outer conical portion surrounding the central domed portion. The combined dome and conical diaphragm is driven by a voice coil at the joinder of the central domed portion and conical outside portion. The voice coil is not required to extend around the diaphragm perimeter and therefore the voice coil and motor can be dimensioned to a reasonable size. An example of such a combined spherical and conical diaphragm is shown in U.S. Pat. No. 4,628,155 entitled ELECTRO-ACOUSTIC MOTOR FOR HORNS, issued to Robineau et al on Dec. 9, 1986. The Robineau et al patent also discloses a phasing plug with a plurality of channels extending from the conical portion of the diaphragm to the throat of an external horn.

The device of Robineau et al suffers from the disadvantage that sound waves generated from different parts of the diaphragm (i.e. the domed central portion and conical outside portion) do not reach the throat of the horn at the same time, resulting in phase cancellation which results in lost acoustical energy, loss of smoothness in frequency response, and non-uniform wavefronts which give rise to degraded directional performance.

Furthermore, the throat of the horn in the Robineau et al speaker is shown as being linear. This results in a discontinuity where the throat joins the external horn, thereby contributing to additional phase cancellation due to reflection of sound from the discontinuity to the diaphragm, resulting in reduced sound transmission efficiency.

According to the present invention, a phasing plug is provided for use with a combined spherical and conical diaphragm, including a plurality of equal length channels extending from predetermined locations on the diaphragm to the throat of the horn. The spacing and location of the time compensated paths through the phasing plug are optimized for use with a combined spherical and conical diaphragm in a mid-range driver. Also, a predetermined throat geometry is provided conforming to a rate of change of cross-sectional area which is optimized for uniform acoustic loading of the diaphragm independent of frequency.

As a result, the amplitude and phase response of the speaker in accordance with the present invention is very smooth and linear while the total harmonic distortion is low (e.g. typically 1.2% THD at 120 dB worst case).

According to another aspect of the present invention, a method of forming diaphragms for loudspeakers is provided using a composite material which is molded and cured to the desired shape.

One prior art acoustic diaphragm and the method of construction is shown in U.S. Pat. No. 2,873,813 (Haerther et al) wherein a porous flexible material is impregnated with a thermo-setting resin, the material being mounted and cured in such a manner that the diaphragm has an impervious central portion and porous peripheral portion.

U.S. Pat. Nos. 2,873,813; 4,076,098; 4,128,138 and 4,518,642 each disclose fabric diaphragm structures and procedures for forming the same which are well known in the art.

However, according to the present invention, the fabric weave of individual layers of a multiple-layer resin impregnated fabric (i.e. pre-preg cloth) are angularly arranged with respect to each other according to a predetermined offset orientation, and then cured using a mold cavity with one hard die surface and a second die having a surface of silicone rubber or other flexible release material. This die arrangement allows uniform pressure to be applied to the fabric layers during curing of the resin and permits the formation of an increased uniform-strength diaphragm.

By using a non-uniform diaphragm surface and regular offset spacing of the weaves, thick and thin portions of the diaphragm develop as the weaves bunch up or lie flat relative to one another. This results in irregular cloth thickness. As mentioned above, the flexible die surface applies uniform pressure to the cloth for evening out the non-uniform thickness of cloth. The flexible die surface compensates for heat expansion of the hard die, and squeezes excess resin from the cloth.

In general, according to the present invention, there is provided a loudspeaker comprised of a diaphragm for generating sound waves, including a peripheral conical portion adjacent and surrounding a central domed portion, a flared horn adjacent the diaphragm for receiving and projecting the sound waves into an acoustical space and providing acoustic loading, a phasing plug intermediate the diaphragm and horn defining sound pathways for impedance matching of the diaphragm and horn, and a plurality of sound channels extending through the phasing plug from the peripheral conical portion and the central domed portion of the diaphragm to the horn, whereby the plurality of sound channels provide equal time compensated paths for the sound waves generated at both the peripheral conical portion and the central domed portion of the diaphragm.

According to another aspect of the present invention, there is provided a method of molding multiple layers of resin impregnated fabric comprising the steps of arranging the multiple layers of fabric with angular orientation of weave with respect to successive adjacent ones of the layers, placing the layers of fabric between opposing surfaces of a mold comprised of hard die surface and an opposing flexible die surface, heating the hard die surface for curing the resin, and squeezing the fabric layer between the opposing surfaces of the mold, whereby the flexible die surface applies uniform pressure to the fabric layers during curing of the resin notwithstanding any non-uniform thickness of the multiple layers of fabric, resulting in formation of a uniform mold of the multiple fabric layer.

A better understanding of the present invention will be obtained with reference to the detailed description below in conjunction with the following drawings, in which.

Figure 1:
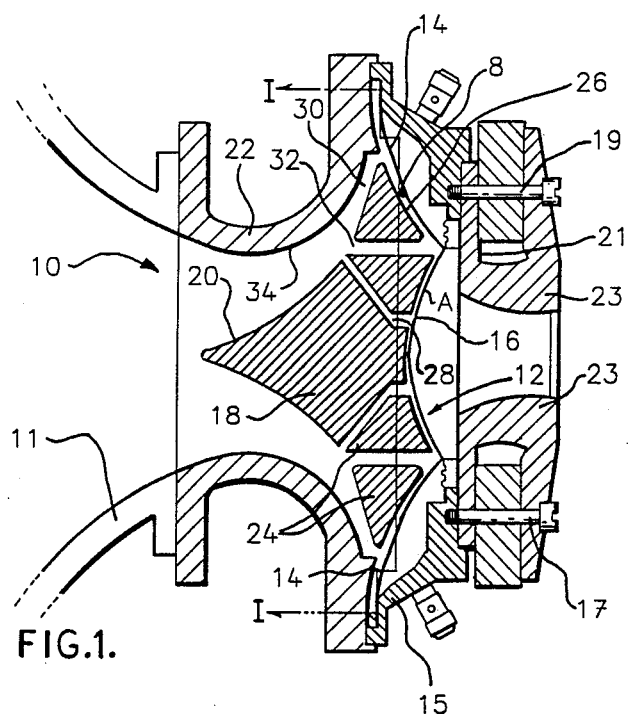
FIG. 1 is a cross-sectional close-up view of a loudspeaker constructed in accordance with one embodiment of the present invention.

Turning to FIG. 1, a loudspeaker 10 is shown for connection to an external horn assembly partially shown and designated as 11. The loudspeaker 10 is comprised of a diaphragm 12 which includes a peripheral conical portion 14 and a central domed portion 16 integral with the conical portion. The diaphragm may be constructed of any convenient material but is preferably fabricated from a plurality of cloth layers bonded together, as described in greater detail below with reference to FIG. 2.

The diaphragm is mounted to a rigid cast alloy frame 15 to which a magnet 23 is secured via a pair of bolts 17 and 19. A high temperature epoxy, flat wire voice coil 21 is connected to the diaphragm 12 where the domed portion 16 meets the conical portion 14. The permanent magnet 23 has undercut pole pieces producing a symmetrical field in the vicinity of the voice coil 21. The rigid cast alloy frame establishes a fixed distance separation between magnet 23 and diaphragm 12.

A phasing plug/throat assembly 18 is shown comprised of a central portion 20, an outer or throat portion 22 and an insert portion 24 which is located adjacent the joinder portion of diaphragm 12 where the conical portion 14 meets the domed portion 16. The insert portion 24 may be of one-piece or two-piece construction cemented together.

The insert portion 24 has a slot 26 formed therein defining a sound-transmitting pathway and is positioned adjacent the central portion 20 and the outer or throat portion 22 to define additional pathways 28 and 30, respectively. The phasing plug assembly 18 is constructed such that the slot 26 and the pathways 28 and 30 are of the same length, so that the path length for sound from the beginning of each slot to the location 32 is the same. Furthermore, the slots or pathways 26, 28 and 30 are evenly spaced across the surface of diaphragm 12, resulting in uniform velocity and displacement of air at the beginning of each slot. Moreover, the pathways 26, 28 and 30 are proportionally dimensioned to provide equal volumetric displacement and velocity of air therewithin. As a result, a uniform load is applied to all portions of the diaphragm 12 resulting in a balance of pressure across the entire diaphragm surface.

Figure 2:
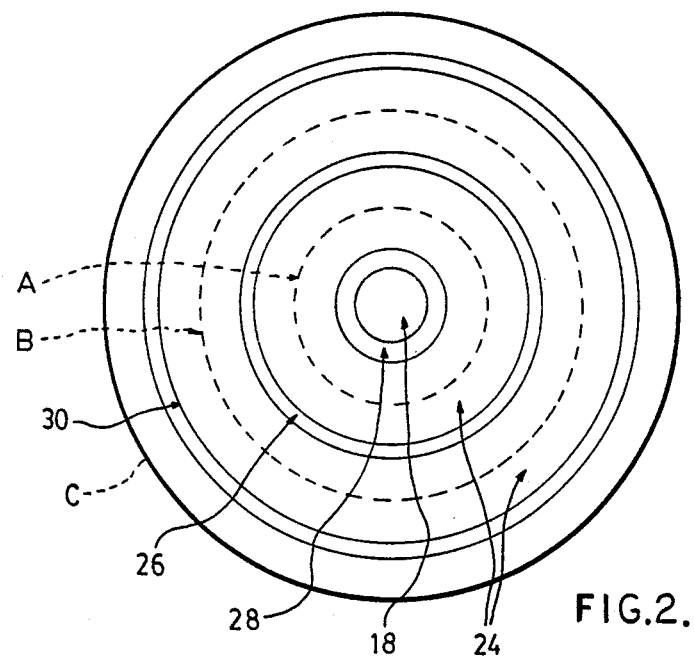
FIG. 2 is a cross-sectional view along the line I—I in FIG. 1.

With reference to FIGS. 1 and 2 together, the lines A and B define portions of diaphragm 12 which are midway between the sound pathways 28 and 26; and pathways 26 and 30, respectively. The ratio of the cross-sectional area of pathway 26 to the toroidal area bounded by lines A and B is equal to the ratio of the cross-sectional area of pathway 28 to the area of the circle circumscribed by the line A, and to the ratio of the cross-sectional area of pathway 30 to the toroidal area bounded by the outer perimeter of diaphragm 12 (i.e. the line C) to the line B. For the embodiment shown, the ratio is approximately 6:1. Also, the slot 30 is positioned mid-way between lines B and C; the slot 26 is positioned mid-way between lines B and A; and the slot 28 is positioned mid-way between the line A and the centre of the plug assembly 18. Thus, the net movement of air along lines C, B, A and at the centre is zero, and there is a uniform distance for air displaced by the diaphragm 12 to travel to the closest adjacent one of the pathways 26, 28 and 30. The dimensions of pathways 26 and 28 are such that pressure changes in the vicinity of region A create equal velocity displacement of air in pathways 26 and 28. Likewise, pressure changes in the vicinity of B result in equal velocity displacement of air in pathways 26 and 30 since the ratios of cross-sectional areas of the slots or pathways to the adjacent areas bounded by the lines A, B and C, are the same.

As discussed above, sound pressure generated by vibration of the diaphragm results in transmission of sound via the time compensated pathways 26, 28 and 30 to the location 32 without phase cancellation.

The location 32 defines the throat of a horn and the contour of the inner wall 34 of the outer portion 22 provides the first portion of the flare of the horn which is then continued by horn assembly 11 mounted to the loudspeaker 10. The throat geometry provided by inner wall 34 in combination with central portion 20 of the phase plug assembly provides a constant directivity waveguide for the combined sound waves appearing at location 32. The specific curvature of the throat geometry provides a constant acoustic load independent of frequency. Furthermore, low frequency loading in a mid-range driver typically requires a long horn. Since there is no discontinuity between the throat 34 and external horn assembly 11, the horn effectively starts at the location 32, in contrast with prior art systems in which the horn starts at the end of the phase plug assembly.

The horn assembly 11 does not form part of the present invention.

The loudspeaker assembly of FIG. 1 is particularly useful as a mid-range driver operating in a range of approximately 200 to 2,000 Hz, but the principles thereof are applicable to speakers of any range and to diaphragms of differing shape.

Figure 3A:
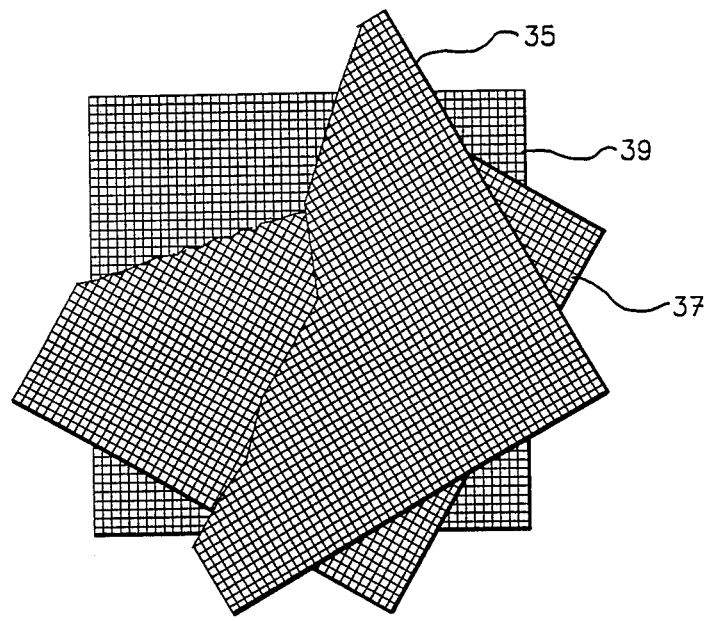
FIG. 3A is a partially broken plan view of multiple fabric layers for fabricating a diaphragm in accordance with a further aspect of the present invention.

The diaphragm 10 is preferably formed from multiple fabric layers as shown in FIG. 3A. Three such layers 35, 37 and 39 are shown arranged with the weave at 120 degrees to the next adjacent layer. Multiple fabric layers are preferable because of the high internal losses which result thereby. A uniformly strong product can be obtained using multiple layers with angularly arranged weaves since variations in stretch in the weave are evened out by the relative positioning of the layers.

Figure 3B:
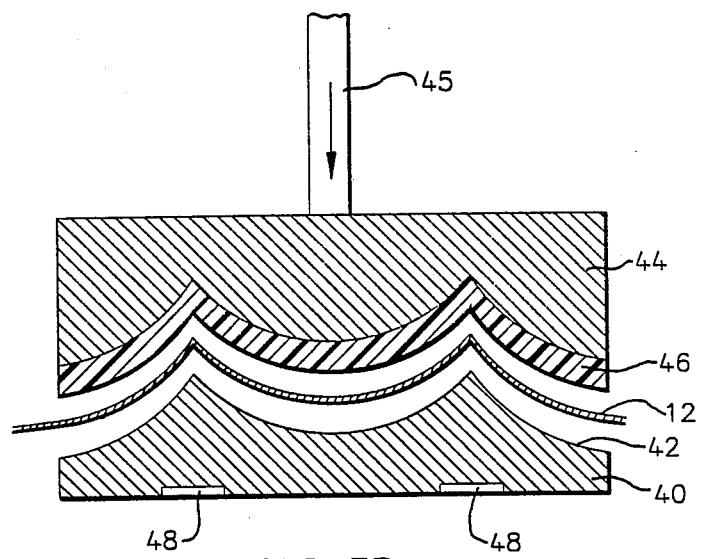
FIG. 3B is a close-up cross-sectional view of a multiple layer fabric being molded in accordance with a further aspect of the present invention.

The layers of fabric, with their weave angularly arranged with respect to each other, are pre-impregnated with a suitable resin, and are placed in a mold cavity shaped to conform to the desired shape of the diaphragm. As shown in FIG. 3B, the mold cavity comprises a hard die surface 40, typically of aluminum with a coating 42 of Teflon TM, Frecote TM or other release material, and a second die 44 connected to a pressure ram 45 and having a surface 46 of silicone rubber or other flexible release material on a hard aluminum backing plate. The hard die surface 40 also includes one or more heating elements 48 embedded therewith.

The pre-impregnated fabric is conventionally known in the art as "pre-preg".

In operation, the multiple layers of fabric 12 are placed on the heated die surface 40 and the second die surface 44 is pressed against the fabric layers 12 for curing the fabric layers and squeezing out excess resin. The flexible release material 46 allows the application of uniform pressure to be applied to the fabric layers 12 and permits the formation of a uniform diaphragm product.

This novel procedure may be used to form loudspeaker diaphragms having a variety of shapes, and could also be used to manufacture other thin laminates for industrial applications, such as skin surfaces for dirigibles, etc. In this regard, the shape or profile of the die surface may be modified to suit a particular application.

In summary, the loudspeaker of the present invention provides a uniform path length for sound from the diaphragm to commencement of the horn throat as well as uniform loading of the diaphragm due to optimized dimensions of the sound pathways. The loudspeaker of the present invention has been found to be particularly useful when applied to acoustic waveguide speakers of the variety developed by Dr. E. R. Geddes of the Audio Engineering Society.

The loudspeaker design of the present invention results in substantial advantages over prior art systems, as discussed above. The loudspeaker is characterized by extremely uniform frequency and phase response, low harmonic distortion due to the time compensated pathways, and enhanced efficiency due to uniform loading on the diaphragm.

Also, the phase plug assembly of the present invention is very easy to manufacture as compared with prior art phase plugs since the insert 24 may be manufactured separately from the central portion 20, without the requirement for sophisticated molds and injections to form the time compensation sound pathways.

A person understanding the present invention may conceive of other embodiments or variations therein. All such modifications and variations are believed to be within the sphere and scope of the present invention as defined by the claims appended hereto.

I claim:

1. A loudspeaker, comprised of:
 (a) diaphragm means for generating sound waves, including a peripheral conical portion adjacent to and surrounding a central domed portion,
 (b) a flared horn adjacent said diaphragm means for receiving and projecting said sound waves into an acoustical space,
 (c) phasing plug means intermediate said diaphragm means and said horn defining sound pathways for impedance matching of said diaphragm means and said horn, and
 (d) a plurality of sound pathways extending through said phasing plug means from the peripheral conical portion and the central domed portion of said diaphragm means to said horn, providing equal time compensated paths for said sound waves generated by both said peripheral conical portion and said central domed portion of said diaphragm means, wherein said phasing plug means is further comprised of a central conical member, centred adjacent said central domed portion of said diaphragm means, and an annular insert member surrounding said central conical member and positioned adjacent the join of said peripheral conical portion and said central domed portion of said diaphragm means, wherein at least one of said plurality of sound pathways is defined by an air gap separation between said central conical member and said annular insert member, and another one of said plurality of sound pathways is defined by a slot forming a sound transmitting channel through said annular insert member, wherein said air gap and said slot are of equal length and extend to an identical location of said horn, and further comprising an additional sound pathway defined by a further air gap separation between said annular insert member and said horn, said additional sound pathway being of equal length to said air gap and said slot, and extending from a distal region of said annular insert portion to said identical location of said horn.

2. A loudspeaker as defined in claim 1, wherein said flared horn and phasing plug means each conform to a uniform curvature forming a constant directivity waveguide therebetween, such that said impedance matching is independent of the frequency of said sound waves.

3. A loudspeaker, comprised of:
 (a) diaphragm means for generating sound waves, including a peripheral conical portion adjacent to and surrounding a central domed portion,
 (b) a flared horn adjacent said diaphragm means for receiving and projecting said sound waves into an acoustical space, (c) phasing plug means intermediate said diaphragm means and said horn defining sound pathways for impedance matching of said diaphragm means and said horn, and (d) a plurality of sound pathways extending through said phasing plug means from the peripheral conical portion and the central domed portion of said diaphragm means to said horn, providing equal time compensated paths for said sound waves generated by both said peripheral conical portion and said central domed portion of said diaphragm means, wherein at least one of said plurality of sound pathways extends through said phasing plug means from the join of said peripheral conical portion and said central domed portion to said horn.

* * * * *